United States Patent Office 3,118,841
Patented Jan. 21, 1964

3,118,841
LUBRICATION AND HYDRAULIC FLUID
COMPOSITION
Douglas H. Moreton, Pacific Palisades, Calif., assignor to
Douglas Aircraft Company, Inc., Santa Monica, Calif.
No Drawing. Filed Feb. 9, 1960, Ser. No. 7,548
35 Claims. (Cl. 252—78)

This invention relates to a new fluid composition useful particularly as a lubricant, or hydraulic fluid and lubricant, capable of withstanding relatively high operating temperatures.

For many uses a liquid lubricant is required which is not only effective as a lubricant over a wide temperature range but also has good stability at relatively high temperatures. Such a normally liquid lubricant, or hydraulic fluid and lubricant, in addition to having the usual combination of properties making it a good lubricant or hydraulic fluid should also have a relatively low viscosity at extremely low temperatures and an adequately high viscosity at relatively high temperatures and, in addition, must have adequate stability at the high operating temperatures of use. Still further, it is important that such a composition have low volatility and especially have a balanced volatility, that is, an important component should not volatilize away from the composition. Furthermore, it is important that the fluid be compatible with and not adversely affect at least some material which can be used for the seals of the system in which the fluid is used. That is, in systems requiring such seals, it is necessary either that it be possible to find a material which can be used for such seal with which the fluid is compatible or that, possibly, the fluid be compatible with presently used seal material, such as, for example, the Buna-N rubber O ring and neoprene chevrons used in hydraulic sytems. Such liquid lubricants or hydraulic fluid and lubricants are required, for example, as high temperature jet-turbine lubricants, or for high temperature hydraulic systems, such as in a high speed aircraft or in a hydraulic system located near a high temperature jet-turbine power plant of a jet-turbine aircraft.

To illustrate such requirements, a relatively low viscosity at extremely low temperatures such as −40° F., and −65° F., for example, and below is required for ease of starting where such temperatures are encountered and adequately high viscosity and stability are necessary at high operating temperatures such as, for example, 400° to 500° F. and above.

This invention is based primarily on the discovery of suitable materials which are very desirable for use as such functional fluids or hydraulic fluids but which have the disadvantage of harmfully affecting the packing materials or seals in such systems, such as Buna-N, neoprene, etc. and on the discovery that this disadvantage can be overcome by the addition to such materials of means soluble therein counteracting the harmful effects on these packing materials while at the same time being compatible with such suitable materials and not impairing their desirable properties for use as such functional or hydraulic fluids, and, further, improving some of their already desirable properties.

In accordance with my invention the discovery has been made that a liquid composition having a surprising combination of satisfactory properties as indicated above can be made by compounding (1) an orthosilicate ester having a total of from 16 to 60 carbon atoms and from 1 to 2 silicon atoms each of which has at least three of the four chemical bonds attached to alkoxy radicals of from 4 to 12 carbon atoms, and, when having only one such silcon atom, the fourth bond is attached to such an alkoxy radical, and, when having two such silicon atoms, the fourth bond of each is attached to the same linking oxygen atom, said orthosilicate being very desirable for use as such functional or hydraulic fluid but having the disadvantage of deplasticizing and shrinking packing materials such as Buna-N and neoprene, and (2) means plasticizing the packing materials soluble in and compatible with such orthosilicate counteracting such shrinking and improving the sealing effect of such packing materials with which used, without impairing the desirable properties.

The orthosilicates include the tetra (alkyl) orthosilicates and the (tri-alkoxysilico) tri-alkyl orthosilicates, otherwise referred to as hexa(alkoxy) disiloxanes, such as hexa-(2-ethylbutoxy) disiloxane and hexa(2-ethylhexoxy) disiloxane. These ortho-silicates may also be described as orthosilicates selected from the group consisting of tetraalkyl orthosilicates and hexa(alkoxy) disiloxanes, in which the alkyl or alkoxy radicals may have from 4 to 10 carbon atoms and in which the total number of carbon atoms in the orthosilicate is from 18 to 40, although it has been found that the orthosilicates in which the alkyl or alkoxy radicals ave from 4 to 12 carbon atoms and the total number of carbon atoms in the orthosilicates is from 16 to 60, are suitable for the purposes of this invention, although it is preferred to have a total of from about 24 to 48 carbon atoms.

In addition to the particular trialkoxysilico trialkyl orthosilicate, or hexa(alkoxy)disiloxanes, referred to above, namely, the hexa(2-ethylbutoxy) and (hexa(2-ethylhexoxy)disiloxanes, other hexa(alkoxy)disiloxanes may be used in which the aliphatic radicals of the alkoxy groups are, for example, 1-ethylpropyl, 1,3-dimethylbutyl, 2-methylpentyl, 1-methylhexyl, 1-ethylpentyl, 2-butylhexyl, and 1-methyl-4-ethyloctyl.

The orthosilicates of this invention may be represented by the following formula

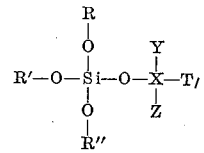

in which R, R', R'' are alkyl radicals having from 4 to 12 carbon atoms, O is oxygen, Si is silicon, X is a member of the group consisting of carbon and silicon, and, when X is carbon, T, Y and Z are hydrogen or alkyl radicals such that the radical

is an alkyl radical having from 4 to 12 carbon atoms, and, when X is silicon, T, Y and Z are alkoxy radicals having from 4 to 12 carbon atoms.

The tetra-octyl orthosilicates are preferred, however. These particularly include tetra(2-ethylhexyl) orthosilicate and the tetra-(iso-octyl) orthosilicates and, more particularly, those in which the iso-octyl radicals are obtained from iso-octyl alcohol derived from the Oxo process. Such an iso-octyl alcohol, for example, may be derived from a mixture of alcohols made from a petroleum cut of olefins predominantly $C_7$, but containing some $C_6$ and $C_8$, which is converted to the corresponding alcohols by the Oxo process to produce a mixture of alcohols predominantly $C_8$, but containing some $C_7$ and $C_9$. For example, an iso-octyl alcohol may be used containing about 55 to 60 percent iso-octyl(6-methylheptyl), about 5 to 10 percent $C_9$ alkyl groups, with the rest mostly other $C_8$ isomers and a small amount of $C_7$ isomers. Such an iso-octyl alcohol will herein be referred to as a "mixed-iso-octyl alcohol"; and when such a mixed-iso-octyl alcohol is used to make the corresponding (tetra-octyl) orthosilicate, it produces what is herein termed a tetra-(mixed-iso-octyl) orthosilicate or an Oxo-tetra(iso-octyl) orthosilicate.

The means for generally effecting the function of counteracting the shrinkage caused by the orthosilicate and improving the sealing effect of the packing material with which the orthosilicate is used, without impairing the desirable properties thereof, include a plasticizer for the Buna-N or neoprene soluble in and compatible with the orthosilicates for the purpose of use as a functional fluid or hydraulic fluid and lubricant over the temperature range of from −65° F. and −40° F. to 400° F. to 500° F. and above. In accordance with the invention, the further discovery has been made that one such plasticizing means particularly includes suitable oily complex esters obtained by reacting dibasic acid, blycol, and monohydric alcohol, more particularly described below, pentaerythritol tetra(n-caproate), dibasic acid esters such as di(2-ethylhexyl) sebacate, azelate and adipate, and certain phosphates, such as diphenyl (2-ethylhexyl) phosphate, tri(2-ethylhexyl) phosphate, tributyl phosphate, tributoxyethyl phosphate, etc. Such means also include suitable di-alkyl esters of dibasic acids in which the alkyl radicals are tertiary alkyl carbinyl to provide a composition having a high degree of thermal stability. It is important for the purposes of this invention that the plasticizer be compatible with the orthosilicate over the entire range of from −65° F. to 500° F. and while only a number of suitable plasticizers are disclosed above, only skilled in the art and having this disclosure before them can ascertain other plasticizers which will be satisfactory for the purposes of this invention. The invention is not limited to those plasticizers which have been disclosed but intended to include those compounds which will produce the same results.

The oily complex esters suitable for the purpose of my invention include those described in United States Letters Patent No. 2,499,984 to Beavers et al. These esters are bland, oily complex esters derived from the reaction on dibasic acids, glycols, and monohydric alcohols as described in said patent and below.

To produce these bland, oily complex esters, as described in said patent, it is necessary to take the dibasic acids, glycols, and monohydric alcohols which are defined below, to mix them in proportions providing an excess of both glycol and alcohol on the basis of equivalents, to react them by heating to promote esterification and then transesterification, taking off the excess of glycol and alcohol, to heat the reaction mixture to 195° C. to 205° C., preferably 200° C., and to reduce the pressure of the reaction mixture at this temperature range below 30 mm. The reaction is continued until the resulting product has an acid number approaching zero. For practical purposes the reaction is carried on until the acid and hydroxyl numbers are individually less than two.

During the reaction alcohol and glycol are distilled out of the reaction mixture as it is heated and heating is continued until the product, as shown by hydrolysis to its component parts, contains residues of alcohol, glycol, and acid in proportions such that the condition is fulfilled as defined by the equation $$x+2y=2z$$

and the molar ratio of alcohol to glycol to acid as condensed together comes within the limits of 1.2/0.4/1 and 0.8/0.6/1. In the above equation $x$ represents moles of alcohol, $y$ moles of glycol, and $z$ moles of dibasic acid.

The acids which are used in forming the products of this invention are azelaic and sebacic acid. Mixtures of these acids may also be used.

The glycols which are used are acyclic, saturated, non-tertiary dihydric alcohols of seven to ten carbon atoms in branched chain arrangement. Of such glycols, those avaliable through common reactions are primarily 1,3-diols and these are particularly useful for the preparation of the products of this invention. Typical glycols which may be used are:

2-ethyl-1,3-pentanediol,
2,4-dimethyl-1,3-pentanediol,
2,2-diethyl-1,3-propanediol,
2-isopropyl-2-methyl-1,3-propanediol,
2-isobutyl-2-methyl-1,3-propanediol,
2-tert.-butyl-2-methyl-1,3-propanediol,
2-ethyl-2-isopropyl-1,3-propanediol,
2-ethyl-1,3-hexanediol,
2-isopropyl-1,3-pentanediol,
2-ethyl-4-methyl-1,3-pentanediol,
2,5-dimethyl-1,3-hexanediol,
2-methyl-1,3-octanediol,
2-ethyl-1,3-heptanediol,
2-isopropyl-1,3-hexanediol,
2-ethyl-2-tert.-butyl-1,3-propanediol,
2-methyl-2-neopentyl-1,3-propanediol,
2-amyl-2-ethyl-1,3-propanediol,
2-tert.-butyl-2-isopropyl-1,3-propanediol,
2-isopropyl-4,4'-dimethyl-1,3-pentanediol, and
2-hexyl-2-methyl-1,3-propanediol.

In these glycols the alcoholic hydroxyl groups are attached at primary or secondary carbon atoms and the carbon atoms are in branched chain arrangement relative to the position of hydroxyl groups. Many of the glycols illustrated are obtainable from olefins through the "oxo" reaction with carbon monoxide and hydrogen and reaction of the intermediate aldehyde with formaldehyde. Mixtures of glycols may be used as well as single glycols.

Typical of the monohydric, saturated, aliphatic alcohols of six to nine carbon atoms in branched chain arrangement are:

2-methylpentanol,
2-ethylbutanol,
2,3-dimethylbutanol,
1,4-dimethyl-2-pentanol,
4-methylpentanol,
4-methyl-2-pentanol,
5-methylhexanol,
5-methyl-2-hexanol,
2,4-dimethylpentanol,
3,4-dimethylpentanol,
2,2,3-trimethylbutanol,
2,2,4-trimethylpentanol,
2-isopropyl-3-methylbutanol,
3,5-dimethylpentanol,
2-ethylpentanol,
2-heptanol,
2-methylhexanol,
4-methyl-2-hexanol,
2-hexanol,
4-methyl-3-hexanol,
2-isopropyl-3,3-dimethylbutanol,
2,2,4,4-tetramethylpentanol,
6-methyl-2-octanol,
5-methyl-2-octanol,
5,5-dimethyl-2-pentanol,
3,3-dimethylheptanol,
2-propyl-3,3-dimethylbutanol,
1-methyl-5,5-dimethylhexanol,
7-methyl-2-octanol, or
4,5-dimethyl-2-heptanol.

These alcohols are non-tertiary. They may be used as single, pure alcohols or as mixtures. Many of the alcohols are obtainable through the "oxo" reaction of olefins with carbon monoxide and hydrogen in the presence of a cobalt catalyst. Alcohols obtained from the reaction of carbon monoxide and hydrogen on an alkaline catalyst may also be used in the preparation of the products of this invention. The alcohols used are non-tertiary; that is, the hydroxyl group is attached to a primary or a secondary carbon atom. The carbon chain is branched with respect to the hydroxyl group.

The initial charge to the reaction vessel should comprise an excess of glycol and monohydric alcohol over that required on a basis of chemical equivalency for the dibasic acid. In general, the ratio of alcohol to glycol at the start may be taken between 4 to 1 and 1 to 2. The optimum starting ratio for yielding a final product having all the component parts in the needed proportions depends upon a number of factors. These are the choice of monohydric alcohol and glycol, and conditions of reaction, and the apparatus. Some of the alcohols and glycols are more volatile or less stable than others and require relatively larger proportions at the start than in the case of less volatile components. There is usually a difference in volatility of monohydric alcohol and glycol which may be compensated for by proper proportioning. The amount of each component which is lost from the reaction mixture will depend in part upon the particular schedule followed in respect to time, temperature, rate of heating, rate of refluxing and condensing, and like factors. These are closely connected with the particular arrangement of apparatus used.

Given a particular monohydric alcohol and a glycol, one can readily ascertain for a given apparatus a favorable reaction schedule and the proportions of starting materials to yield the desired proportions of component parts in the end product. If in a trial there is not found the full content of monohydric alcohol or glycol components in the product, the proportion of the deficient component may readily be increased in the starting mixture. There is thus no difficulty in obtaining a final product having advantageous properties and having the composition defined by the equation and ratios stated above.

The early stages of reaction may be favorably carried through with the aid of volatile solvents, such as benzene, toluene, xylene, close-cut naphthas, chlorinated solvents, and the like. These assist in removal of water of esterification through azeotropic distillation. When they have served their purpose, they are distilled from the reaction mixture, which is then taken to its final temperature under reduced pressure.

The reaction of alcohol, glycol, and acid may be hastened by addition to the reacting mixture of small amounts (0.1% to 1%) of an acidic catalyst, such as zinc chloride, sodium acid sulfate, p-toluene sulfonic acid, etc. Air may be excluded from the reaction mixture by sweeping out the apparatus with a gas such as hydrogen or nitrogen. The reaction is started usually by heating to reflux temperatures and then continuing the heating, taking off volatile materials, including azeotropic mixtures, and reducing the pressure as rapidly as conditions will permit. At the end point of about 200° C. the pressure in the reaction vessel is preferably carried down to 1 mm. to 15 mm.

Typical methods of preparing such complex esters used in accordance with this invention and data on properties are given in the following examples.

*Example 1 of Patent No. 2,499,984.*—There were charged to a reaction vessel equipped with stirrer and reflux condenser controlled at 100° C. with steam 202 g. of sebacic acid, 88 g. of 2-ethyl-1,3-hexanediol, and 208 g. of 2-ethylhexanol, 0.1 g. of zinc chloride being used as a catalyst. The reaction mixture was heated to maintain a moderate, steady rate of distillation with reflux of the alcohol and glycol. The condenser permitted water vapor and azeotropes to pass. The temperature at the start of refluxing was 150° C. The temperature of the batch was gradually increased until at the end of eight hours the temperature of 200° C. was attained. While the reaction mixture was held at this temperature, the pressure was gradually reduced, the rate of reduction of pressure being controlled by the rate at which distillate could be taken off through the condensing system. After sixteen hours, the pressure was reduced to 10 mm. where it was held for an hour.

Analysis of the reaction product showed a ratio of 1.19 to 0.405 to 1.0 for the 2-ethylhexanol/2-ethyl-1,3-hexanediol/sebacic acid ratio. The acid number was 1.12.

This product is an oily liquid, having viscosities of 10.17 centistokes at 210° F., 61.20 cs. at 100° F., and 9,240 cs. at −25° F. and does not freeze when held at −105° F. for 24 hours. It has a flash point of 490° F. and a fire point of 540° F. The Dean-Davis viscosity index is 139.5.

*Example 2 of Patent No. 2,499,984.*—The preparation of Example 1 was repeated with the use of 0.4 g. of zinc chloride. Heating as before was carried to 200° C. but the pressure was reduced at the end to 5 mm.

The viscosity of this product was 9.07 cs. at 210° F. Its acid number was 0.4. Its pour point was below −60° F., although it did not actually freeze at −105° F.

*Example 3 of Patent No. 2,499,984.*—There were charged to the reaction vessel 140 g. of 2-ethyl-2-butyl-1,3-propanediol, 332 g. of 2-ethylhexanol, and 322 g. of sebacic acid with 0.3 g. of zinc chloride added to serve as a catalyst. The reaction mixture was heated and a constant rate of distillation was maintained until water was no longer evolved. Distillation started at 150° C. batch temperature. The temperature of the reaction mixture was carried up to 200° C. within four hours and the pressure gradually reduced to 10 mm. after another eight hours.

The product obtained contained the residues of alcohol, glycol, and acid in the ratio of 0.90/0.55/1.0. It had an acid number of 1.1. Viscosities were determined as follows: At 210° F., 9.21 cs.; at 100° F., 56.72 cs.; at 0° F., 2116 cs.; and at −40° F., 29,070 cs. The viscosity index (D-D) is 136. The pour point is −80° F., but the product does not freeze at −105° F.

The substitution of azelaic acid for sebacic acid yields a product of the same general properties.

*Example 4 of Patent No. 2,499,984.*—There were charged to the reaction vessel 323 g. of sebacic acid, 140 g. of 2-ethyl-1,3-hexanediol, and 369 g. of an isononyl alcohol which consisted of an isomeric mixture of about 70% of 3,5,5-trimethylhexanol and 30% of 2-isopropyl-3,3-dimethylbutanol. Thereto was added 0.5 g. of zinc chloride to serve as a catalyst. The mixture was stirred and heated. At 158° C. distillation began. After three more hours of heating, the temperature of the batch reached 200° C. where it was maintained during the rest of the preparation. An hour after this temperature had been attained, the pressure was gradually reduced until after eleven hours of heating the pressure was lowered to 10 mm. Thereupon, the batch was stripped at about 4 mm. The product obtained was an oily liquid which had an acid number of 1.1. It had a viscosity of 10 cs. at 210° F., of 81 cs. at 100° F., and of 2500 cs. at 0° F. Its viscosity index is 140. It does not freeze at −105° F.

The products which result from these reactants condensed within the specified proportions to an acid number approaching zero are a complex mixture, the apparent or average molecular weight of which rests on choice of components and proportions. The distribution of individual molecular sizes in a given product may be represented by a rather peaked bell-shaped curve or probability curve. The relative location of the peak of this curve varies with proportions used but products prepared from the recited ratios of the designated components all possess the unusual properties which have been related above and which distinguish them from condensates known heretofore.

For the purposes of my invention such complex esters based on sebacic acid, that is, in which the dicarboxylic acid is sebacic acid, are preferred. One such product is a relatively low viscosity, high molecular weight complex ester compound identified herein as complex ester A made from sebacic acid, 2-ethyl 1-3 hexanediol and 2-ethylhexanol, as, for example, in accordance with Example 1 of Patent No. 2,499,984 given above for making such complex esters, but having a slightly lower viscosity than the complex ester of said Example 1. This complex ester A is described below in terms of its properties and characteristics. It is essentially homologous and is not a solution of a high molecular weight polymer in a hydrocarbon oil or other similar fluid. It is compatible over a wide range with mineral oils.

A comparison of the inspection properties of this complex ester A and the recorded values for a variety of petroleum stocks shows that it has the following unique properties:

(1) Low volatility, high flash point, and appreciably lower flammability for a given viscosity range.
(2) Outstanding low temperature viscosity behavior, and "effective viscosity index" of 140+4 from 210° F. to −40° F. with very slight low-temperature viscosity hook.
(3) Absence of sluge in oxidized samples.
(4) Improved lubricity and load-carrying capacity for a given viscosity range.
(5) No permanent viscosity loss as a result of shear. No indication of temporary viscosity loss under high rates of shear.
(6) Very low, viscous pour point; no wax precipitation.

This complex ester A has the following inspection properties:

ASTM Neut. No. _____ 0.30 approx.
Color:
   (ASTM Scale) _____ 5 max.
   (Hellige Scale) _____ 13.0 max.
Flash point (Cleveland Open Cup) __ 490° F. min.
Fire point (Cleveland Open Cup) ___ 530° F. min.
Pour point (ASTM D–97–39) _____ Below −60° F.
Freezing point _____ Below −100° F.
Volatility (CRC–L–25–745) _____ 0.75% max.
Falex tests:
   Wear _____ 4.0 mg/hr. max.
   Seizure _____ 2250 lbs. at seizure, min.

| Viscosity | | |
|---|---|---|
| Temperature, °F. | Centistokes | Saybolt Universal Seconds (approx.) |
| 210 | 9.0±0.5 | 55 |
| 100 | 52.0±3.0 | 240 |
| 0 | 1,800±100 | 8,200 |
| −40 | 27,000 max. | 135,000 |
| −60 | 140,000 max. | 700,000 |

Viscosity index _____ 140±4.
Solubility in petroleum oils _____ Completely miscible.

ASTM slope data:
   Temperature range, °F.—    Slope
     210 to 100 _____ 0.615
     210 to −40 _____ 0.626

Specific gravity:   Values compared with density of water at 75° F.
   Temperature, °F.—
     210 _____ 0.900
     100 _____ 0.940
     75 _____ 0.950
     −40 _____ 0.998

This complex ester A is only one member of a chemical series and other related members differing in viscosity may be used for the purposes of my invention, depending upon the desired properties of the final product made in accordance with this invention.

My invention will be illustrated by the following examples.

Example 1:
   90 volume percent tetra-(2-ethyl hexyl) orthosilicate
   10 volume percent of complex ester A The resulting liquid composition had the following properties:

Viscosity at—
   −40° F. _____ 468 centistokes.
   100° F. _____ 8.31 centistokes.
   210° F. _____ 2.59 centistokes.
Viscosity index _____ 160.
Cloud point _____ −25° F.
Pour point _____ Below −85° F.

The deplasticization of the silicate without the complex ester A and the plasticizing effect of the composition of Example 1 above with the complex ester A in the silicate is illustrated by the results of swelling tests made in accordance with standard tests used in the aircraft industry for evaluating hydraulic system packing material swell performance in which neoprene and Buna-N packing materials were immersed respectively, in (1) the silicate and (2) the fluid of Example 1 with the complex ester A added, with the liquid at 160° F., for seven days and the change in volume observed as given in the following table:

TABLE 1

*Percent Volume Change*

| | Neoprene | | Buna-N | |
|---|---|---|---|---|
| | 3 days | 7 days | 3 days | 7 days |
| Tetra-(2-ethyl hexyl) orthosilicate | −0.39 | −1.03 | −9.54 | −10.2 |
| Fluid of Example 1 containing 10% complex ester A | +4.42 | +6.67 | +0.13 | +2.47 |

The negative values in the table above for the tetra-(2-ethyl hexyl) orthosilicate without the complex ester A indicate a reduction in volume, that is, a shrinking in volume, which results from the deplasticizing by the silicate on the packing material. The addition of the complex ester A counteracts the deplasticization of the silicate alone and causes a slight increase in volume, that is, a moderate swelling, which is desirable for the packing material because such moderate swelling increases the desired sealing effect with respect to the liquid in the hydraulic system.

From the foregoing it will be seen that in accordance with my invention I have discovered a means which is soluble in and compatible with the tetra alkyl orthosilicate which counteracts the deplasticizing effect of the silicate and plasticizes packing materials such as Buna-N or neoprene to increase the sealing effect in a system where the fluid is used as a hydraulic fluid or functional fluid in combination with packing materials such as Buna-N, neoprene, etc.

Moreover, this fluid of Example 1 has improved lubricating properties over the tetra-(2-ethylhexyl) orthosilicate which itself has good lubricating properties. This improvement is noted especially for use in pumps lubricated by the fluid where the fluid is being pumped at relatively high temperatures. One particular aspect of the improvement of the lubricating properties of the tetra-(2-ethylhexyl) orthosilicate by the addition of this complex ester is shown by the results set out in the following table:

TABLE 2

*4-Ball Scar Diameters in Millimeters*

| Load | Frictional surface | Tetra-(2-ethyl hexyl) orthosilicate, 1 hour at 175° F. | Fluid of Example 1, 1 hour at 350° |
|---|---|---|---|
| 1 kg | Steel-on-bronze | 1.54 | 0.822 |
| 40 kg | ___do___ | 2.14 | 1.69 |

From the foregoing table it will be evident that the addition of the complex ester A to the tetra-(2-ethyl hexyl) orthosilicate in accordance with the fluid of Example 1 substantially lowered the scar diameters even though the temperature was substantially increased from 175° F. to the high value of 350° F.

The following table further shows such improvement in lubricating properties:

TABLE 3

*4-Ball Scar Diameters in Millimeters, Steel-on-Steel, 40 Kilogram Load*

Tetra-(2-ethylhexyl) orthosilicate, 1 hour at 350° F__ 1.2
Fluid of Example 1, 1 hour at 350° F_____ 0.90

This fluid of Example 1 in addition to having the foregoing desirable properties was found to be a good lubricant or hydraulic fluid and lubricant and when used under conditions with oxygens excluded, as in a sealed unit, or when inhibited against oxidation, had excellent thermal stability even as high as 400 to 500° F. Also, it was effective to maintain the proper plasticity in Buna-N O rings and neoprene chevrons, so that it was not only compatible with the material used for seals but, surprisingly, in addition, improved the sealing effect of the Buna-N rings and neoprene chevrons.

The desirable high temperature properties, particularly thermal stability at relatively high temperatures, is shown by the use of the fluid of Example 1 in a severe test in a substantially sealed system with a vane pump operating at the pressure of 400 pounds per square inch at a minimum inlet temperature of the fluid of 500° F. for a period of time of 16 hours. In this vane pump the frictional surfaces were heat-treated steel vanes rubbing on a heat-treated steel cam ring under boundary layer lubricating conditions. Under these extreme test conditions the vane pump did not seize and was operating satisfactorily when the test run was discontinued at the end of the 16 hour period. The neutralization number of this fluid was 0.1 milligram of KOH per gram of fluid before the test and only 0.20 after the end of the test, and the refractive index for the D line of Na at 25° C. was 1.4404 before the test and 1.4403 after.

Example 2:
    95 volume percent tetra-(2-ethyl hexyl) orthosilicate
    5 volume percent complex ester A The resulting liquid composition had the following properties:

Viscosity at—
    −40° F_____ 376 centistokes.
    100° F_____ 7.36 centistokes.
    210° F_____ 2.4 centistokes.
Viscosity index_____ 160.
Cloud point_____ −25° F.
Pour point_____ Below −85° F.

This fluid in addition to having the foregoing desirable properties was found to be a good lubricant or hydraulic fluid and lubricant and when used under conditions with oxygen excluded, as in a sealed unit, had excellent thermal stability even as high as 400 to 500° F. Also, it was effective to maintain the proper plasticity in Buna-N O rings and neoprene chevrons of a hydraulic system, so that it was not only compatible with the material used for seals, but, surprisingly, in addition, improved the sealing effect of the rings and chevrons.

In accordance with my invention it is an especially surprising discovery that, although the tetra(alkyl)orthosilicate has a tendency to shrink such sealing and packing materials as Buna-N and neoprene, causing a deterioration in the packing or sealing material, the addition of the complex ester appears to counteract the deleterious effect of the silicate in this respect and in combination produces a fluid effective to maintain the proper plasticity in such packing or sealing materials and improves the sealing and packing effect thereof.

Example 3:
    85 volume percent hexa(2-ethyl butoxy) disiloxane
    15 volume percent of complex ester A The resulting liquid composition had the following properties:

Viscosity at—
    −65° F_____ 961 centistokes.
    100° F_____ 9.98 centistokes.
    210° F_____ 3.25 centistokes.
Cloud point_____ +4° F.
Pour point_____ Below −90° F.

The deplasticization of this disiloxane without the complex ester A and the plasticizing effect of the composition of Example 3 with the complex ester A in the disiloxane is illustrated by the results of swelling tests on Buna-N packing material for seven days at 160° F. as follows:

TABLE 4

*Buna-N—7 Days—160° F.*

| | Percent volume change | Shore A hardness change |
|---|---|---|
| Hexa(2-ethyl butoxy) disiloxane_____ | −9.6 | +15 points. |
| Fluid of Example 3 containing 15% of complex ester A. | −0.15 | +4 points. |

The large negative value in the table above for the hexa(2-ethyl hexyl butoxy) disiloxane without the complex ester A indicates a substantial reduction in volume, that is, a substantial shrinkage, which results from the deplasticizing by the disiloxane on the packing material. The addition of the complex ester A counteracts this deplasticization of the disiloxane alone and reduces the shrinkage to a negligible amount so that when used as a hydraulic or functional fluid, the sealing effect of the packing material is not deleteriously affected. If desired, it will usually be found preferable to add a sufficiently larger proportion of the complex ester A to cause a slight swelling of the packing material, as, for example, about 20 volume percent instead of 15 volume percent.

Example 4:
    85 volume percent hexa(2-ethyl hexoxy) disiloxane
    15 volume percent of complex ester A The resulting liquid composition had the following properties:

Viscosity at—
    −65° F_____ 4200 centistokes.
    100° F_____ 14.8 centistokes.
    210° F_____ 4.16 centistokes.
Cloud point_____ +46° F.
Pour point_____ Below −90° F.

The deplasticization of this disiloxane without the complex ester A and the plasticizing effect of the composition of Example 4 with the complex ester A in the disiloxane is illustrated by the results of swelling tests on Buna-N packing material for seven days at 160° F. as follows:

TABLE 5

*Buna-N—7 Days—160° F.*

| | Percent volume change | Shore A hardness change |
|---|---|---|
| Hexa(2-ethyl hexoxy) disiloxane_____ | −10.5 | +16 points. |
| Fluid of Example 4 containing 15% of complex ester A. | +0.15 | +5 points. |

The large negative value in the table above for the hexa(2-ethyl hexoxy) disiloxane without the complex ester A indicates a substantial reduction in volume, that is, a substantial shrinkage, which results from the deplasticizing by the disiloxane on the packing material. The addition of the complex ester A thus counteracts this deplasticization of this disiloxane alone and produces a slight swelling so that when the composition of Example 4 is used as a hydraulic or functional fluid, the sealing effect of the packing material is improved.

From the foregoing it will be seen that I have discovered a means to counteract the shrinking or deplasticizing effect of the orthosilicates referred to above when used in combination with packing materials as described above, which means is soluble in and compatible with such orthosilicate and which plasticizes the packing material and counteracts such shrinking, thus improving the sealing effect of such packing material when used with a hydraulic or functional fluid containing a sufficient amount of such orthosilicate causing such shrinking or deplasticization.

Further, in accordance with my invention, I have discovered another means for performing this function in such orthosilicates. This additional means is pentaerythritol tetra(n-caproate). The following examples illustrate this further discovery.

Example 5:
    85 volume percent hexa(2-ethyl butoxy) disiloxane
    15 volume percent of pentaerythritol tetra(n-caproate)

The resulting liquid composition had the following properties:

Viscosity at—
    −65° F _____ 1070 centistokes.
    100° F _____ 8.65 centistokes.
    210° F _____ 2.92 centistokes.
Cloud point _____ −52° F.
Pour point _____ −90° F.

The counteraction and plasticizing effect of the addition of the pentaerythritol tetra(n-caproate) to this disiloxane is shown by the results of swelling tests on Buna-N packing material for seven days at 160° F. in the following table:

TABLE 6

*Buna-N—7 Days—160° F.*

|  | Percent volume change | Shore A hardness change |
|---|---|---|
| Hexa(2-ethyl butoxy) disiloxane | −9.6 | +15 points. |
| Fluid of Example 5 containing 15% of pentaerythritol tetra(n-caproate). | +0.27 | +3 points. |

The large negative value in the table above for the hexa-(2-ethyl butoxy) disiloxane without the pentaerythritol tetra(n-caproate) indicates a substantial reduction in volume of the Buna-N packing material, that is, a substantial shrinking resulting from the deplasticizing effect of the disiloxane on the packing material. The addition of the pentaerythritol tetra (n-caproate) counteracts the deplasticization of this disiloxane alone and produces a slight swelling of the packing material so that when the composition of Example 5 is used as a hydraulic or functional fluid, the sealing effect on the packing material is improved.

Example 6:
    85 volume percent of hexa(2-ethyl hexoxy)disiloxane
    15 volume percent of pentaerythritol tetra(n-caproate)

The resulting liquid composition had the following properties:

Viscosity at—
    −65° F _____ 3490 centistokes.
    100° F _____ 12.9 centistokes.
    210° F _____ 3.74 centistokes.
Cloud point _____ −52° F.
Pour point _____ Below −90° F.

The counteraction and plasticizing effect of the addition of the pentaerythritol tetra(n-caproate) to this disiloxane is shown by the results of swelling tests on Buna-N packing material for seven days at 160° F. in the following table:

TABLE 7

*Buna-N-7 Days—160° F.*

|  | Percent volume change | Shore A hardness change |
|---|---|---|
| Hexa(2-ethyl hexoxy) disiloxane | −10.5 | +16 points. |
| Fluid of Example 6 containing 15% of pentaerythritol tetra (n-caproate). | +0.08 | +4 points. |

The large negative value in the table above for the hexa-(2-ethyl hexoxy) disiloxane without the pentaerythritol tetra (n-caproate) indicates a substantial reduction in volume of the Buna-N packing material, that is, a substantial shrinking resulting from the plasticizing effect of the disiloxane on the packing material. The addition of the pentaerythritol tetra (n-caproate) counteracts the deplasticization of this disiloxane alone and produces a slight swelling of the packing material so that when the composition of Example 6 is used as a hydraulic or functional fluid, the sealing effect on the packing material is improved.

Example 7:
    90 volume percent tetra-(2-ethyl hexyl) orthosilicate
    10 volume percent tri(2-ethyl hexyl) phosphate The addition of the tri(2-ethyl hexyl) phosphate counteracted the shrinking effect of the Buna-N packing material as shown in the following table:

TABLE 8

|  | Percent volume change Buna-N | |
|---|---|---|
|  | 3 days | 7 days |
| Tetra-(2-ethyl hexyl) orthosilicate at 160° F | −9.51 | −10.2 |
| Fluid of Example 7 containing 10% tri(2-ethyl hexyl) phosphate at 300° F | +4.81 | +1.8 |

The improvement of lubricating properties by the addition of tri(2-ethyl hexyl) phosphate is shown in the following table:

TABLE 9

*4-Ball Scar Diameters in Millimeters*

[1 hour at 75° F.]

| Load | Frictional surface | Silicate | Fluid of Example 7 |
|---|---|---|---|
| 1 kg | Steel-on-bronze | 1.54 | 1.24 |
| 40 kg | ___do___ | 2.14 | 1.55 |

From the foregoing table it will be evident that the addition of the phosphate ester to the silicate in accordance with this Example 7 substantially lowered the scar diameters and thus improved the lubricating properties of the orthosilicate.

Example 8:
    85 volume percent hexa(2-ethyl butoxy) disiloxane
    15 volume percent di(2-ethyl hexyl) sebacate The resulting liquid composition had the following properties:

Viscosity at—
- −65° F _____ 621 centistokes.
- 100° F _____ 7.72 centistokes.
- 210° F _____ 2.75 centistokes.

Cloud point _____ +4° F.
Pour point _____ Below −90° F.

The counteraction and plasticizing effect of the addition of the di(2-ethyl hexyl) sebacate to this disiloxane is shown by the results of swelling tests on Bune-N packing material for seven days at 160° F. in the following table:

TABLE 10

*Buna-N—7 days—160° F.*

| | Percent volume change Buna-N | Shore A hardness change |
|---|---|---|
| Hexa(2-ethyl butoxy) disiloxane | −9.6 | +15 points. |
| Fluid of Example 8 containing 15% di(2-ethyl hexyl) sebacate. | −3.5 | +8 points. |

The large negative value in the table above for the hexa(2-ethylbutoxy)disiloxane without the di(2-ethylhexyl)sebacate indicates a substantial reduction in volume of the Buna-N packing materials, that is, a substantial shrinking resulting from the plasticizing effect of the disiloxane on the packing material. The addition of the di(2-ethylhexyl)sebacate counteracts the deplasticization of this disiloxane alone and reduces the shrinkage of the packing material so that when the composition of Example 8 is used as a hydraulic or functional fluid, the sealing effect on the packing material is improved. A larger proportion, for example, about 20 to 25 percent of the sebacate will effect further improvement.

Example 9:
- 85 volume percent hexa(2-ethylhexoxy)disiloxane
- 15 volume percent di(2-ethylhexyl) sebacate The resulting liquid had the following properties:

Viscosity at—
- −65° F _____ 2590 centistokes.
- 100° F _____ 10.0 centistokes.
- 210° F _____ 3.42 centistokes.

Cloud point _____ +12° F.
Pour point _____ Below −90° F.

The counteraction and plasticizing effect of the addition of the *di*(2-ethylhexyl)sebacate to this disiloxane is shown by the results of swelling tests on Buna-N packing material for seven days at 160° F. in the following table:

TABLE 11

*Buna-N—7 Days—160° F.*

| | Percent volume change Buna-N | Shore A hardness change |
|---|---|---|
| Hexa(2-ethylhexoxy)disiloxane | −10.5 | +16 points. |
| Fluid of Example 9 containing 15% di(2-ethylhexyl)sebacate. | −4.1 | +9 points. |

The large negative value in the table above for the hexa(2-ethylhexoxy)disiloxane without the di(2-ethylhexyl) sebacate indicates a substantial reduction in volume of the Buna-N packing material, that is, a substantial shrinking resulting from the plasticizing effect of the disiloxane on the packing material. The addition of the di(2-ethylhexyl)sebacate counteracts the deplasticization of this disiloxane alone and reduces the shrinkage of the packing material so that when the composition of Example 9 is used as a hydraulic or functional fluid, the sealing effect on the packing material is improved. A larger proportion, for example, about 20 to 25 percent of the sebacate will effect further improvement. Moreover, at elevated temperatures of operation the fluid of Example 9 would be satisfactory.

Example 10:
- 93 volume percent hexa(2-ethylhexoxy)disiloxane
- 7 volume percent di(2-ethylhexyl)sebacate The resulting liquid had the following properties:

Viscosity at—
- −65° F _____ 2370 centistokes
- 100° F _____ 11.4 centistokes.
- 210° F _____ 3.60 centistokes.

Cloud point _____ +10° F.
Pour point _____ Below −90° F.

Example 11:
- 93 volume percent hexa(2-ethylhexoxy)disiloxane
- 7 volume percent pentaerythritol tetra(n-caproate)

The resulting liquid had the following properties:

Viscosity at—
- −65° F _____ 2770 centistokes.
- 100° F _____ 12.9 centistokes.
- 210° F _____ 3.79 centistokes.

Cloud point _____ −50° F.
Pour point _____ Below −90° F.

Example 12:
- 93 volume percent hexa(2-ethylhexoxy)disiloxane
- 7 volume percent complex ester A The resulting liquid had the following properties:

Viscosity at—
- −65° F _____ 3100 centistokes.
- 100° F _____ 13.1 centistokes.
- 210° F _____ 3.94 centistokes.

Cloud point _____ +46° F.
Pour point _____ Below −90° F.

The improvement in lubricating properties for the fluids of the three foregoing Examples 10, 11, and 12 is shown in the following table:

TABLE 12

*4-Ball Scar Diameters in Millimeters*

[1 hour at 175° F.—steel-on-steel]

| Load | Hexa(2-ethyl hexoxy) disiloxane | Fluid of— | | |
|---|---|---|---|---|
| | | Example 10 | Example 11 | Example 12 |
| 1 kg | 0.25 | | | 0.22 |
| 40 kg | 0.89 | 0.75 | 0.76 | 0.69 |

Further examples illustrating my invention are as follows:

Example 13:
- 90 volume percent tetra-(2-ethylhexyl) orthosilicate
- 15 volume percent complex ester of Example 1 of Patent 2,499,984

Example 14:
- 90 volume perecnt tetra-(2-ethylhexyl) orthosilicate
- 10 volume percent complex ester of Example 2 of Patent 2,499,984

Example 15:
- 90 volume percent tetra-(2-ethylhexyl) orthosilicate
- 10 volume percent complex ester of Example 3 of Patent 2,499,984

Example 16:
- 90 volume percent tetra-(2-ethylhexyl) orthosilicate
- 10 volume percent complex ester of Example 4 of Patent 2,499,984

Example 17:
 85 volume percent hexa(2-ethylbutoxy) disiloxane
 15 volume percent complex ester of Example 1 of Patent 2,499,984

Example 18:
 85 volume percent hexa(2-ethylbutoxy) disiloxane
 15 volume percent complex ester of Example 2 of Patent 2,499,984

Example 19:
 85 volume percent hexa(2-ethylbutoxy) disiloxane
 15 volume percent complex ester of Example 3 of Patent 2,499,984

Example 20:
 85 volume percent hexa(2-ethylbutoxy) disiloxane
 15 volume percent complex ester of Example 4 of Patent 2,499,984

Example 21:
 85 volume percent hexa(2-ethylhexoxy) disiloxane
 15 volume percent complex ester of Example 1 of Patent 2,499,984

Example 22:
 85 volume percent hexa(2-ethylhexoxy) disiloxane
 15 volume percent complex ester of Example 2 of Patent 2,499,984

Example 23:
 85 volume percent hexa(2-ethylhexoxy) disiloxane
 15 volume percent complex ester of Example 3 of Patent 2,499,984

Example 24:
 85 volume percent hexa(2-ethylhexoxy) disiloxane
 15 volume percent complex ester of Example 4 of Patent 2,499,984

The composition of Examples 13, 14, 15 and 16 are substantially the same as the composition of Example 1 of my invention, those of Examples 17, 18, 19 and 20 are substantially the same as the composition of Example 3 of my invention, and those of Examples 21, 22, 23 and 24 substantially the same as Example 4 of my invention, varying only slightly in viscosity with the viscosity of the complex ester component, which is only a small proportion of the whole composition.

Other examples of the invention include:

Example 25:
 85 volume percent tetra-(2-ethylhexyl) orthosilicate
 15 volume percent di(2-ethylhexyl) azelate Example 26:
 90 volume percent tetra-(Oxo-iso-octyl) orthosilicate
 10 volume percent complex ester of Example 1 of Patent 2,499,984

Example 27:
 85 volume percent tetra-(Oxo-iso-octyl) orthosilicate
 15 volume percent pentaerylthritol tetra(n-caproate)

Example 28:
 85 volume percent tetra-(2-ethylhexyl) orthosilicate
 15 volume percent pentaerythritol tetra(n-caproate)

Further examples illustrating my invention are as follows, in which the proportions are in volume.

Example 29:
 90% tetra(2-ethylhexyl) orthosilicate
 10% di(2,2,4-trimethylpentyl) sebacate Example 30:
 90% tetra(2-ethylhexyl) orthosilicate
 10% di(1-methylcyclohexylmethyl) sebacate Example 31:
 90% tetra(2-ethylhexyl) orthosilicate
 10% di(2,2,4-trimethylpentyl) adipate Example 32:
 90% tetra(2-ethylhexyl) orthosilicate
 10% di(1-methylcyclohexylmethyl) adipate Example 33:
 90% tetra(Oxo-iso-octyl) orthosilicate
 10% di(2,2,4-trimethylpentyl) sebacate Example 34:
 90% tetra(Oxo-iso-octyl) orthosilicate
 10% di(1-methylcyclohexylmethyl) sebacate Example 35:
 90% tetra(Oxo-iso-octyl) orthosilicate
 10% di(2,2,4-trimethylpentyl) adipate Example 36:
 90% tetra(Oxo-iso-octyl) orthosilicate
 10% di(1-methylcyclohexylmethyl) adipate Example 37:
 85% hexa(2-ethylhexoxy) disiloxane
 15% di(2,2,4-trimethylpentyl) sebacate Example 38:
 85% hexa(2-ethylhexoxy) disiloxane
 15% di(1-methylcyclohexylmethyl) sebacate Example 39:
 85% hexa(2-ethylhexoxy) disiloxane
 15% di(2,2,4-trimethylpentyl) adipate Example 40:
 85% hexa(2-ethylhexoxy) disiloxane
 15% di(1-methylcyclohexylmethyl) adipate Example 41:
 85% hexa(2-ethylbutoxy) disiloxane
 15% di(2,2,4-trimethylpentyl) sebacate Example 42:
 85% hexa(2-ethylbutoxy) disiloxane
 15% di(1-methylcyclohexylmethyl) sebacate Example 43:
 85% hexa(2-ethylbutoxy) disiloxane
 15% di(2,2,4-trimethylpentyl) adipate Example 44:
 85% hexa(2-ethylbutoxy) disiloxane
 15% di(1-methylcyclohexylmethyl) adipate In addition to the di-alkyl esters of dibasic acids referred to above and to those having tertiary alkyl carbinyl groups, other di-alkyl esters of dibasic acids may be used including those represented by the formula:

$$ROCO(CH_2)_nCOOR'$$

where R and R' may have from 4 to 9 carbon atoms and are saturated branched chain alkyl groups, the $(CH_2)_n$ group is preferably straight chain, and $n$ may be any number from 4 to 8, and the ester may have from 14 to 28 carbon atoms per molecule. Such esters of adipic, pimelic, suberic, azelaic, and sebacic acids may be used. Also included are di-butyl adipate and di-amyl adipate, specifically di-isoamyl adipate and di(2-ethylhexyl) adipate.

It is a further discovery in accordance with my invention that deterioration of the compositions described above caused by oxidation can be inhibited by the addition to such compositions of phenyl alpha-naphthylamine as an oxidation inhibitor.

Example 45: To liquid composition of Example 1 was added 0.2 percent of phenyl alpha-naphthylamine as an oxidation inhibitor. It is an additional feature of discovery of my invention that phenyl alpha-naphthylamine is effective for this purpose in this composition. This composition had the following properties:

Viscosity at—
 −40° F_____ 476 centistokes.
 100° F_____ 8.36 centistokes.
 210° F_____ 260 centistokes.
Viscosity index_____ 157.
Neut. No. (mg. KOH/gm.)_____ 0.05.
C.O.C. flash point_____ 405° F.
C.O.C. fire point_____ 460° F.
Cloud point_____ −15° F.
Pour point_____ Below −85° F.

The percent swell after 3 and 7 days' immersion in this fluid at 160° F. and the initial and final Shore hardness of both a Nuckles #5135865-5N-112 neoprene chevron and a Linear #AN-6227-26, 65° Shore, #LT2-70

Buna-N O ring were determined and the following results obtained:

SWELL TESTS

| | Percent swell | | "A" Shore hardness | |
|---|---|---|---|---|
| | 3 days | 7 days | Initial | Final |
| 5135865 neoprene chevron | +4.42 | +6.67 | 95 | 90 |
| AN-6227-26, LT2-70 Buna N "O" ring | +0.13 | +2.47 | 80 | 80 |

The oxidation resistance, thermal stability and corrosion were tested in accordance with Federal Specification VV-L-791d, Test No. 530.8.1, revised November 15, 1948, modified by using a higher temperature of 300° F. and exposing to air instead of passing air through the fluid. The following results were obtained:

Viscosity in centistokes at 130° F.:
 Initial _____ 5.60
 Final _____ 6.20

Neutralization number (mg. KOH/gm.):
 Initial _____ 0.09
 Final _____ 0.16

Weight change on metals:
 Copper _____ −0.07
 Iron _____ +0.01
 Aluminum _____ +0.01
 Magnesium _____ +0.10
 Cadmium plated iron_____ +0.05
Fluid separation_____ None The foregoing results indicate a remarkable thermal stability and oxidation resistance, and the effect upon metals was negligible.

Although as pointed out above phenyl alpha naphthylamine is preferred as the oxidation inhibitor in the compositions of my invention, that is, as the means for inhibiting oxidation, particularly of the silicate component and especially in the combination of components, it is a significant feature in accordance with this aspect to my invention that the discovery has been made that the deleterious effects of oxidation in such compositions can be inhibited and thus my invention includes such compositions containing a means for inhibiting the deleterious effects or for inhibiting the deterioration resulting from the presence of oxygen causing oxidation. Moreover, other oxidation inhibitors may be used in addition to the preferred phenyl alpha naphthylamine including those of the aryl amine type and of the phenolic type. The first group includes those amines which have at least one aromatic nucleus with two or more condensed aromatic rings. These include, for example, the naphthylamines: primary, secondary or tertiary alkyl aryl amine in which the alkyl, aryl or aralkyl radicals are attached to an aromatic nucleus or preferably to the nitrogen atom or both, such as phenyl alpha or beta naphthylamine, tetraline naphthylamine, alpha alpha, alpha beta, or beta beta dinaphthylamines, various phenanthryl, anthryl or picyl naphthylamines, xenyl naphthylamines, benzyl phenyl naphthylamines, diphenyl naphthylamines, phenyl xenyl napthylamines, dixenyl naphthylamines, phenanthryl, anthryl or picyl phenyl amines. Other oxidation inhibitors which may be used include alkyl phenyl amines, diphenyl amines or alkyl phenols, preferably having at least two alkyl radicals in 2, 4 or 6 positions to the OH radical, at least two alkyl radicals being linked to the aromatic nucleus through a tertiary carbon atom; or alpha or beta naphthols, alkylated naphthols, phenols or naphthols containing ether, thio ether, etc., linkages, polyhydric alkyl benzenes or naphthalenes, such as alkylated catechol.

It is a further discovery in accordance with my invention that I have discovered a means to increase the viscosity index and viscosity at such elevated temperatures as 210° F. of the compositions described above, with or without an oxidation inhibitor. In accordance with this aspect of my invention I have discovered that a suitable poly alkyl methacrylate is effective for this purpose.

The poly alkyl methacrylates suitable for the purpose of this invention are in general those resulting from the polymerization of alkyl methacrylates in which the alkyl groups may have from about 4 to 12 carbon atoms. The alkyl groups may be mixtures such as derived from a mixture of alcohols, and in which case there may be included some alkyl groups having as low as 2 carbon atoms and as high as about 18 carbon atoms. The number of carbon atoms in the alkyl group should preferably be such that the polymer is compatible with the particular fluids used. Usually, it will be satisfactory for the alkyl group of the methacrylate monomer to be from about 8 to 10 carbon atoms. The alkyl group may be a branched chain or iso-alkyl, but is preferably normal alkyl. The molecular size of the polymerized alkyl methacrylate should be great enough to increase the viscosity of the fluids to which added and small enough to be compatible therewith. In general, the average molecular weight will be within about 6,000 to 12,000. The poly alkyl methacrylate should be such and in sufficient proportion to increase the viscosity at elevated temperatures (such as 210° F., for example) and to increase the viscosity index.

In compounding the compositions of this invention, the alkyl methacrylate polymer may be added to the silicate or the monomer may be polymerized in situ in the silicate by adding the unpolymerized alkyl methacrylate ester thereto and then polymerizing the monomer to the desired degree.

Suitable poly alkyl methacrylates for the purposes of this invention are made and sold by and are available from the Rohm and Haas Company, Philadelphia, Pennsylvania, under its trademark Acryloid and particularly designated, for example, as Acryloid HF-845, Acryloid HF-855, Acryloid HF-860. In these designations the last two numerals, that is, "45," "55" and "60" denote the viscosity in centistokes of the poly alkyl methacrylate contained in the commercial product measured in a 30 weight percent solution in toluene at 100° F., or other standard base stock having a viscosity of 0.54 centistoke at 100° F. (the viscosity of toluene). In general, these polymers have a molecular weight within the range of about 2,000 to 14,000, and the preferred range of viscosity in the terms given above is from about 45 to 60. Usually, the alkyl radicals of these polymerized alkyl methacrylates will be $C_8$, but may be $C_8$-$C_{10}$.

Usually a minor proportion and particularly from 0.2 to 10 percent by volume of the poly alkyl methacrylate (exclusive of any solvent) will be found satisfactory, and preferably a proportion within the range from 1 to 5 percent. This percentage of poly alkyl methacrylate is based on the sum of the other fluids and polymer as being 100 percent.

This aspect of my invention will be illustrated by the following example:

Example 46: To 90 volume percent of Oxo-tetra(isooctyl) orthosilicate was added 10 volume percent of complex ester A and to this resulting mixture was added 5 volume percent of Acryloid HF-855.

This produced a hydraulic fluid and lubricant having the following properties:

Pour point_____ Less than −85° F.
Viscosity (centistokes):
 210° F_____ 4.08.
 130° F_____ 8.69.
 100° F_____ 12.85.
 −40° F_____ 560.
 −65° F_____ Approximately 2000.
Viscosity index_____ 223.

Shell 4-ball lubricity test (600 r.p.m. for 1 hour—scar diameter in millimeters):

| Temp., °F. | Steel on steel | | Steel on bronze | |
|---|---|---|---|---|
| | 1 kg. | 40 kg. | 1 kg. | 40 kg. |
| 167 | 0.240 mm | 0.840 mm | 0.75 mm | 1.14 mm. |
| 350 | 0.346 mm | 0.795 mm | 0.822 mm | 1.69 mm. |

The composition of the foregoing example can be made resistant to the deterioration resulting from oxidation by the addition thereto of a means effective to inhibit oxidation such as phenyl alpha naphthylamine in accordance with my invention. This is illustrated by the following example:

Example 47: In this example the composition is the same as that given in Example 46 except that to the 90 volume percent of said orthosilicate was added 0.2 percent by weight of alpha phenyl naphthalamine. This substantially improved the composition with respect to the effects of oxidation and this composition had the following properties:

Appearance _____ Clear amber liquid.
Odor _____ Mild, pleasant.
Pour point _____ Less than −85° F.
Neutralization number _____ 0.14 (mg. KOH/gm.)
Viscosity (centistokes):
    210° F _____ 4.08.
    130° F _____ 8.69.
    100° F _____ 12.85.
    −40° F _____ 560.
    −65° F _____ Approximately 2000.
Viscosity index _____ 223.

Corrosion and oxidation test at 250° F. per MIL–F–7100:

| Property | Initial | Final | Change, percent |
|---|---|---|---|
| Viscosity at 130° F. (cks) | 8.42 | 9.04 | +7.3 |
| Neutralization number | 0.10 | 0.15 | +50.0 |
| Effect on metals, wt. change (mg./cm.²): | | | |
|   Cu | | −0.023 | |
|   Fe | | +0.023 | |
|   Al | | +0.023 | |
|   Mg | | +0.023 | |
|   Cd/Fe | | −0.093 | |
| Fluid evaporation, percent at 300° F | | 1.8 | |
| Effect on metals, wt. change (mg./cm.²): | | | |
|   Cu | | −0.07 | |
|   Fe | | +0.01 | |
|   Al | | +0.01 | |
|   Mg | | +0.10 | |
|   Cd/Fe | | +0.05 | |
| Fluid evaporation, percent | | 4.0 | |
| Fluid separation | | None | |

Shell 4-ball lubricity test (600 r.p.m. for 1 hour—scar diameter in millimeters):

| Temp., °F. | Steel on steel | | Steel on bronze | |
|---|---|---|---|---|
| | 1 kg. | 40 kg. | 1 kg. | 40 kg. |
| 167 | 0.240 mm | 0.840 mm | 0.75 mm | 1.14 mm. |
| 350 | 0.346 mm | 0.795 mm | 0.822 mm | 1.69 mm. |

Specific gravity:
    28/25° C _____ 0.8872
    25/25° C _____ 0.8962
    0/25° C _____ 0.9151
Specific heat (cal./gm./° C.):
    25° C _____ 0.45
    60° C _____ 0.48
    100° C _____ 0.54
Thermal conductivity (cal./cm.²/cm./° C./sec.):
    Between 25° C. and 37° C _____ $31 \times 10^{-5}$
    85° C. and 100° C _____ $35 \times 10^{-5}$ This fluid was satisfactory as a hydraulic fluid capable of operating at a relatively high temperature range such as 400 to 500° F. while at the same time having many physical properties equal to or better than any comparable petroleum base fluid. These tests show this hydraulic fluid to be useful at temperatures well below −65° F. and above 400° F.

In the foregoing Examples 46 and 47 the Oxo-tetra (iso-octyl) orthosilicate contained octyl radicals derived from a mixture of alcohols made from a petroleum cut of olefins, which resulting alkyl groups contained about 55 to 60% iso-octyl (6-methyl heptyl), about 5 to 10% $C_9$ alkyl groups, with the rest mostly other $C_8$ isomers and a small amount of $C_7$ isomers, and the complex ester A was the fluid described above. The Acryloid HF-855 was a polymerized normal-octyl methacrylate having an average molecular weight of about 8,500 and a range of about 2,000 to 14,000 dissolved in 45 volume percent of a light petroleum oil solvent of 200° F. flash point, the polymer of which has a viscosity of 55 centistokes at 100° F. dissolved in 30 weight percent of toluene. The small percentage of petroleum oil solvent was merely conveniently present in the commercial Acryloid product and performed no important function in the invention. Such a small proportion, however, was not harmful to the final composition. It is preferred to use the polymer dissolved in one of the liquid components of the composition, or a mixture of such components.

Although the results in accordance with my invention are obtained to some degree with any relative proportion of the tetra-alkyl orthosilicate and the complex ester condensate such as complex ester A fluid it is preferred to have from about 5 to 85% of such condensate and correspondingly from about 95 to 15% of the tetra-alkyl orthosilicate. Moreover, for the purpose of making a hydraulic fluid having the desired properties as described above and in addition having the property of maintaining the proper plasticity in Buna N and neoprene type rubber seals, from 5 to 30 percent complex ester A or other such condensate and correspondingly 95 to 70 percent of the orthosilicate is preferred.

The means for inhibiting oxidation such as the phenyl alpha-naphthylamine will usually be added in a proportion of about 0.05 to 1.0 percent by weight of the composition.

It is still a further discovery in accordance with my invention that the compositions described above with or without the oxidation inhibitor and with or without the means for increasing viscosity index, can be improved to withstand relatively high operating temperatures such as from about 500° F. to 650° F., for example.

For many uses a liquid lubricant is required which is not only effective as a lubricant over a wide temperature range but also has good stability at relatively high temperatures. Such a normally liquid lubricant, or hydraulic fluid and lubricant, in addition to having the usual combination of properties making it a good lubricant or hydraulic fluid should also have other properties for such a composition as pointed out above, including a relatively low viscosity at extremely low temperatures, an adequately high viscosity at relatively high temperatures, adequate stability at the high operating temperatures of use, low volatility and especially a balanced volatility, that is, an important component should not volatilize away from the composition, compatibility with and not adversely affecting at least some material which can be used for the seals of the system in which the fluid is used. Such liquid lubricants or hydraulic fluid and lubricants are required, for example, as high temperature jet-turbine lubricants, or for high temperature hydraulic systems, such as in a high speed aircraft or in a hydraulic system located near a high temperature jet-turbine power plant of a jet-turbine aircraft. To illustrate such requirements, a relatively low viscosity at extremely low temperatures such as −80° F., for example, is required for ease of starting where such temperatures are encountered and adequately high viscosity and stability are necessary at high operating temperatures such as, for example, 500 to 650° F.

In accordance with this aspect of my invention I have discovered that this means for stabilizing the fluid at such relatively high temperatures, or, stated in another way, for inhibiting oxidation at such relatively high temperatures, may be, for example a relatively small proportion of dilauryl selenide. Although the dilauryl selenide may be used with any of the fluids described above for the purpose described above, it is an especially important feature of my invention that when used in combination with such an oxidation inhibitor as phenyl alpha naphthylamine, the resulting composition is stabilized with respect to oxidation in the liquid phase resulting from oxygen present or absorbed in the liquid, even at moderate temperatures, by the phenyl alpha naphthalamine and with respect to the oxidation of thermal decomposition products in the vapor state, such as alkyl radicals or olefins resulting therefrom at the relatively high temperatures of from 500 to 650° F. by the dilauryl selenide. Thus my invention includes means for performing these functions, each alone and in combination. This aspect of my invention is illustrated by the following examples.

Example 48: A two component mixture, here referred to as mixture A was made by adding 0.2 percent by weight of phenyl alpha naphthylamine to tetra(Oxo-iso-octyl) orthosilicate. Then a two component mixture, here referred to as mixture B was made by mixing 90 volume percent of mixture A with 10 volume percent of complex ester A, described above. To this mixture B is then added 0.5 percent by weight of dilauryl selenide.

The resulting composition produces a high temperature hydraulic fluid in accordance with my invention inhibited with respect to the deleterious effects resulting from oxidation, not only in the liquid phase at moderate temperatures up to about 400° F. to 450° F. but also in the vapor phase at higher temperatures above about 450° F. and up to about 650° F. In this composition the phenyl alpha naphthylamine is believed to work together with the dilauryl selenide to provide this inhibition against oxidation over such a wide temperature range with the phenyl alpha naphthylamine apparently primarily effective in the liquid at moderate temperatures and the dilauryl selenide primarily effective to inhibit oxidation of thermal decomposition products at the higher temperatures such as above about 450° F. Phenyl alpha naphthylamine alone does not prevent autogenous ignition over an open flask containing the fluid without the dilauryl selenide above a temperature of about 450° F., but with the dilauryl selenide such ignition under these same conditions does not occur until the temperature is raised to above about 500° F. This is an exceedingly surprising phenomena in such a complex mixture of the unusual chemicals involved.

It is a further discovery in accordance with my invention that these new and unexpected results with respect to inhibition of oxidation over such a wide temperature range without deleterious effect upon the composition can be obtained even though there is added to the composition a thickening agent which not only increases viscosity index, but which also increases the viscosity at such elevated temperature as 210° F., as, for example, by the addition thereto of a poly alkyl methacrylate, even though such poly alkyl methacrylate usually renders such a composition more susceptible to oxidation. The following example will illustrate this aspect of my invention:

Example 49: To the final fluid of Example 48 there is added 5 volume percent of Acryloid HF–855. This increased the viscosity index and viscosity at 210° F. of the composition of Example 48 without impairing the surprising results with respect to the inhibition of oxidation obtained from the presence of the phenyl alpha naphthylamine and dilauryl selenide over the wide temperature range referred to above.

The Acryloid HF–855 was a polymerized normal-octyl methacrylate having an average molecular weight of about 8,500 and a range of about 2,000 to 14,000 dissolved in 45 weight percent of a light petroleum oil solvent of 200° F. flash point, the polymer of which has a viscosity of 55 centistokes at 100° F. dissolved in 30 weight percent of toluene. The small percentage of petroleum oil solvent was merely conveniently present in the commercial Acryloid product and performed no important function in the invention. Such a small proportion, however, was not harmful to the final composition. It is preferred to use the polymer dissolved in one of the liquid components of the composition, or a mixture of such components.

In the foregoing Examples 48 and 49 the tetra(Oxo-iso-octyl) orthosilicate contained octyl radicals derived from a mixture of alcohols made from a petroleum cut of olefins, which resulting alkyl groups contained about 55 to 60% iso-octyl (6 methyl heptyl), about 5 to 10% $C_9$ alkyl groups, with the rest mostly other $C_8$ isomers and a small amount of $C_7$ isomers.

In the foregoing examples the densities of the ingredients at room temperature were as follows: Silicate 0.88 gram per cc.; complex ester A 0.958; Acryloid HF–855; and dilauryl selenide 0.92.

In addition to the dilauryl seledine referred to above other means may be used which are effective to some extent for the same purpose, although dilauryl selenide is preferred. In general, these include dialkyl selenides and dialkyl tellurides containing at least 8 carbon atoms in an alkyl group and preferably at least 8 carbon atoms in each alkyl group. These may be represented by the formula

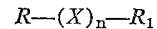

$$R-(X)_n-R_1$$

where $n$ is an integer and is greater than zero. Where $n$ is 2 or more, both straight chain and branched chain groups are comprehended by $(X)_n$. The groups R and $R_1$ may be not only straight and branched chain saturated alkyl groups $C_nH_{2n+1}$, but also straight and branched chain unsaturated aliphatic groups $C_nH_{2n-1}$, $C_nH_{2n-3}$, etc., and also cycloalkyl or cycloaliphatic groups. That is, the groups attached to selenium and tellurium in the compounding agents of the present invention, may be saturated, unsaturated or cyclic aliphatic groups. Also, the groups R and $R_1$ may be substituted by aromatic groups, such as the phenyl, hydroxy phenyl and amino phenyl groups, provided such groups are spaced at least one carbon atom from the group $(X_n)$.

The following specific examples of selenides and tellurides, together with those specifically mentioned hereinabove, will illustrate the selenium and tellurium compounds of the present invention: decyl methyl monoselenide, cetyl ethyl monoselenide, octyl decyl monoselenide, di-eicosyl monoselenide; dioctyl diselenide, didecyl, diselenide, diheptadecyl diselenide, dieicosyl diselenide; decyl methyl monotelluride cetyl ethyl monotelluride, octyl decyl monotelluride, didecyl monotelluride, diundecyl monotelluride, dilauryl monotelluride, ditetradecyl monotelluride, dicetyl monotelluride, diheptadecyl monotelluride, dieicosyl monotelluride, dioctyl ditelluride, didecyl ditelluride, dilauryl ditelluride, dicetyl ditelluride. Among the foregoing, those having a low activity against copper are preferred, such as the dilauryl selenide.

In accordance with one particular aspect of my invention it has been discovered that the complex ester such as the complex ester A not only has the effect of counteracting the shrinking effect of the orthosilicate component on Buna-N packing material, but in addition increases the solubility of the polyalkyl methacrylate with respect to the orthosilicate component and in the compositions containing orthosilicate of my invention.

Usually the proportion of such compounds as the dilauryl selenide will be from about 0.01 to 2 percent by weight of the whole composition.

The compositions of my invention are an improvement, as described above, of orthosilicates, also referred to above, useful as a high temperature functional fluids or hydraulic fluid and lubricants, but unsatisfactory because of the shrinking or deplasticization of the Buna-N and neoprene packing materials, having means soluble therein counteracting the deplasticization and effecting a plasticizing of these packing materials to improve the sealing effect without impairing the desirable properties of the orthosilicate for the intended purpose, so that the resulting composition can be used as a functional fluid or hydraulic fluid and lubricant with such packing materials. Moreover, the addition of such means to the orthosilicate also plasticizes these packing materials to provide satisfactory sealing at high temperatures at which they otherwise become too hard for satisfactory sealing.

Not only are the compositions of my invention made of ingredients compatible and useful for the intended purpose at room temperature but also over the very wide temperature range of from —65° F. (below zero) to the high temperature of about 400 to 500° F. The compositions also have a satisfactory combination of properties not only at room temperature but also over this wide temperature range for the purpose of such a functional fluid or hydraulic fluid and lubricant. In addition to these desirable features, the combination of properties includes an improved lubricity over the orthosilicate alone, as indicated above. Still further, the viscosity at such extremely low temperatures as —40° F. and —65° F. is surprisingly low, and at the same time, the viscosity is adequately high at such elevated temperature of 210° F. and the rate change of viscosity with temperature is low over this wide temperature range. Still further, the compositions have in this combination a high thermal stability at such high temperatures as 400 to 500° F.

In general, the proportion of the plasticizer for the Buna-N and neoprene packing material, as disclosed in the examples above will be that required to counteract the deplasticizing and shrinking effect of the orthosilicate on the packing material and plasticize it so that there is no swell and preferably to provide a small amount of swelling to improve the sealing effect of the packing material. Usually the proportion of such plasticizer will lie within the range from about 5 to 30 volume percent based on the orthosilicate and plasticizer as 100 percent but it will be clear to those skilled in the art that the desired proportion in any particular case will be ascertainable by the swell test referred to above to counteract the shrinking and preferably provide a small amount of swelling, or, in general, will be that proportion which gives the desired sealing effect on the packing material used in the hydraulic system.

This application is a continuation-in-part of my prior applications, Serial No. 191,503, filed October 21, 1950; Serial No. 256,395, filed November 14, 1951, Serial No. 335,979, filed February 9, 1953, Serial No. 349,557, filed April 17, 1953, Serial No. 428,832, filed May 10, 1954, Serial No. 507,170, filed May 9, 1955, and Serial No. 524,285, filed July 25, 1955, all of said prior applications now being abandoned.

The foregoing describes my invention in its preferred aspects and illustrates my invention by way of specific examples, but alteration and modification may be made thereof within the scope of the appended claims without departing from the invention herein disclosed.

What is claimed is:

1. The composition consisting essentially of a major proportion within the range of about 70 to 95% of an orthosilicate ester having a total of from 16 to 60 carbon atoms and from 1 to 2 silicon atoms, each of which has at least three of the four chemical bonds attached to alkoxy radicals of from 4 to 12 carbon atoms, and, when having only one such silicon atom, the fourth bond is attached to such an alkoxy radical, and, when having two such silicon atoms, the fourth bond of each is attached to the same linking oxygen atom, said orthosilicate having the disadvantageous property of shrinking and thus destroying the sealing effect of Buna-N packing material, and a minor but sufficient proportion within the range of about 5 to 30 percent of bland, oily, complex ester which is a condensate of (1) a monohydric, saturated, non-tertiary, aliphatic alcohol of six to nine carbon atoms in branched chain arrangement, (2) an acyclic, saturated, non-tertiary glycol of seven to ten carbon atoms in branched chain arrangement, and (3) a dibasic acid selected from the class consisting of azelaic and sebacic acids, the molar proportions of residues in said condensate from said alcohol, said glycol, and said acid being within the ratios of 1.2 to 0.4 to 1 and 0.8 to 0.6 to 1, and being present in proportions fulfilling the equation $$x+2y=2z$$

where $x$ represents moles of said alcohol residue, $y$ represents moles of said glycol residue, and $z$ represents moles of said acid residue, said complex ester being compatible with said orthosilicate over the temperature range of —65° F. to 500° F. and counteracting said shrinking effect of said orthosilicate on Buna-N packing material, changing such shrinking to a slight swell, and thus improving the sealing effect of said Buna-N packing material.

2. The composition consisting essentially of (1) a major proportion within the range of about 70 to 95% of an orthosilicate ester having a total of from 16 to 60 carbon atoms and from 1 to 2 silicon atoms each of which has at least three of the four chemical bonds attached to alkoxy radicals of from 4 to 12 carbon atoms, and when having only one such silicon atom, the fourth bond is attached to such an alkoxy radical, and, when having two such silicon atoms, the fourth bond of each is attached to the same linking oxygen atom, said orthosilicate ester having the disadvantageous property of causing shrinking of Buna-N packing material; (II) a minor but sufficient proportion within the range of from 30 to 5% of bland, oily complex ester which is a condensate of (1) monohydric, saturated, non-tertiary, aliphatic alcohol of six to nine carbon atoms in branched chain arrangement, (2) an acyclic, saturated, non-tertiary glycol of seven to ten carbon atoms in branched chain arrangement, and (3) a dibasic acid selected from the class consisting of azelaic and sebacic acids, the molar proportions of residues in said condensate from said alcohol, said glycol, and said acid being within the ratios of 1.2 to 0.4 to 1 and 0.8 to 0.6 to 1, and being present in proportions fulfilling the equation $$x+2y=2z$$

where $x$ represents moles of said alcohol residue, $y$ represents moles of said glycol residue, and $z$ represents moles of said acid residue; and (III) a minor and sufficient proportion 0.2 to 10 percent of poly alkyl methacrylate, the alkyl portion of which has from 4 to 12 carbon atoms, and said poly alkyl methacrylate having an average molecular weight from about 6,000 to 12,000 compatible with said composition and effective to increase the viscosity index and viscosity at 210° F. of said composition; said complex ester counteracting the shrinking effect of said orthosilicate on said Buna-N packing material and improving the sealing effect thereof and increasing the compatibility of said poly alkyl methacrylate in said orthosilicate.

3. The composition as defined in claim 1 wherein said orthosilicate is hexa(alkoxy)disiloxane in which the alkoxy radicals have from 4 to 12 carbon atoms and the disiloxane a total of from 24 to 48 carbon atoms.

4. The composition as defined in claim 2 wherein said orthosilicate is hexa(alkoxy) disiloxane in which the alkoxy radicals have from 4 to 12 carbon atoms and the disiloxane a total of from 24 to 48 carbon atoms.

5. The composition consisting essentially of a major proportion within the range of about 70 to 95 percent of tetra(alkyl) orthosilicate the alkyl radicals of which have from 4 to 10 carbon atoms and a total of 18 to 40 carbon atoms, said orthosilicate having the disadvantageous property of shrinking and thus destroying the sealing effect of Buna-N packing material, and a minor but sufficient proportion within the range of about 5 to 30 percent of bland, oily complex ester which is a condensate of (1) a monohydric, saturated, non-tertiary, aliphatic alcohol of six to nine carbon atoms in branched chain arrangement, (2) an acyclic, saturated, nontertiary glycol of seven to ten carbon atoms in branched chain arrangement, and (3) a dibasic acid selected from the class consisting of azelaic and sebacic acids, the molar proportions of residues in said condensate from said alcohol, said glycol, and said acid being within the ratios of 1.2 to 0.4 to 1 and 0.8 to 0.6 to 1, and being present in proportions fulfilling the equation $$x+2y=2z$$

where $x$ represents moles of said alcohol residue, $y$ represents moles of said glycol residue, and $z$ represents moles of said acid residue, said complex ester being compatible with said orthosilicate over the temperature range of −65° F. to 500° F. and counteracting said shrinking effect of said orthosilicate on Buna-N packing material, changing such shrinking to a slight swell, and thus improving the sealing effect of said Buna-N packing material.

6. The composition as defined in claim 5 in which said complex ester is a condensate of sebacic acid, 2-ethyl-1,3-hexanediol, and 2-ethylhexanol.

7. The composition as defined in claim 5 in which said orthosilicate is tetra (octyl) orthosilicate.

8. The composition as defined in claim 7 in which said complex ester is a condensate of sebacic acid, 2-ethyl-1,3-hexanediol, and 2-ethylhexanol.

9. The composition as defined in claim 5 in which said orthosilicate is tetra (2-ethylhexyl) orthosilicate.

10. The composition as defined in claim 9 in which said complex ester is a condensate of sebacic acid, 2-ethyl-1,3-hexanediol, and 2-ethylhexanol.

11. The composition consisting essentially of: (I) a major proportion of 70 to 95 percent of tetra (alkyl) orthosilicate in which each of the alkyl radicals has from 4 to 10 carbon atoms and all four of said alkyl radicals has from 18 to 40 carbon atoms but having the disadvantageous property of causing shrinking of Buna-N packing material; (II) a minor and sufficient proportion of 30 to 5 percent of bland oily complex ester which is a condensate of (1) a monohydric, saturated, non-tertiary, aliphatic alcohol of six to nine carbon atoms in branched chain arrangement, (2) an acyclic, saturated, non-tertiary glycol of seven to ten carbon atoms in branched chain arrangement, and (3) a dibasic acid selected from the class consisting of azelaic and sebacic acids, the molar proportions of residues in said condensate from said alcohol, said glycol, and said acid being within the ratios of 10.2 to 0.4 to 1 and 0.8 to 0.6 to 1, and being present in proportions fulfilling the equation $$x+2y=2z$$

where $x$ represents moles of said alcohol residue, $y$ represents moles of said glycol residue, $z$ represents moles of said acid residue; and (III) a minor and sufficient proportion 0.2 to 10 percent of poly alkyl methacrylate, the alkyl portion of which has from 4 to 12 carbon atoms, and said poly alkyl methacrylate having an average molecular weight from about 6,000 to 12,000 compatible with said composition and effective to increase the viscosity index and viscosity at 210 °F. of said composition; said complex ester counteracting the shrinking effect of said orthosilicate on said Buna-N packing material and improving the sealing effect thereof and increasing the compatibility of said poly alkyl methacrylate in said orthosilicate.

12. The composition as defined in claim 11 in which said orthosilicate is tetra (octyl) orthosilicate, said poly alkyl methacrylate is poly octyl methacrylate, and said complex ester is a condensate of sebacic acid, 2-ethyl-1,3-hexanediol, and 2-ethylhexanol.

13. The composition as defined in claim 12 in which said orthosilicate is tetra (2-ethylhexyl) orthosilicate.

14. The composition as defined in claim 12 in which said orthosilicate is tetra (mixed-iso-octyl) orthosilicate.

15. The composition as defined in claim 12 in which said orthosilicate is tetra (6-methylheptyl) orthosilicate.

16. The composition as defined in claim 5 containing from 0.01 to 2 percent dilauryl selenide.

17. The composition consisting essentially of 70 to 95 percent orthosilicate ester having a total of from 16 to 60 carbon atoms and from 1 to 2 silicon atoms each of which has at least three of the four chemical bonds attached to alkoxy radicals of from 4 to 12 carbon atoms, and, when having one such silicon atom, the fourth bond is attached to such an alkoxy radical, and, when having two such silicon atoms, the fourth bond of each is attached to the same linking oxygen atom, useful as a hydraulic fluid and lubricant but deplasticizing and shrinking Buna-N packing material, and a sufficient proportion of from 5 to 30% of pentaerythritol tetra (n-caproate) dissolved therein and compatible therewith plasticizing said Buna-N packing material and thus counteracting said deplasticizing and shrinking of said Buna-N packing material.

18. The composition as defined in claim 17 wherein said orthosilicate is hexa(alkoxy) disiloxane in which the alkoxy radicals have from 4 to 12 carbon atoms and the disiloxane a total of from 24 to 48 carbon atoms.

19. The composition consisting essentially of 70 to 95% orthosilicate ester having a total of from 16 to 60 carbon atoms and from 1 to 2 silicon atoms each of which has at least three of the four chemical bonds attached to alkoxy radicals of from 4 to 12 carbon atoms, and, when having one such silicon atom, the fourth bond is attached to such an alkoxy radical, and, when having two such silicon atoms, the fourth bond of each is attached to the same linking oxygen atom, useful as a hydraulic fluid and lubricant but deplasticizing and shrinking Buna-N packing material, and a sufficient proportion of from 5 to 30 percent dialkyl ester of dibasic acid represented by the formula ROCO(CH$_2$)$_n$COOR′ where R and R′ may have from 4 to 9 carbon atoms and are saturated branched chain alkyl groups, the (CH$_2$)$_n$ group is straight chain, and $n$ may be any number of 4 to 8, and the ester may have from 14 to 28 carbon atoms per molecule.

20. The composition as defined in claim 19 wherein said orthosilicate ester is hexa(alkoxy)disiloxane.

21. The composition as defined in claim 20 wherein said hexa(alkoxy)disiloxane is hexa(2-ethylhexoxy)disiloxane.

22. The composition as defined in claim 19 wherein said dialkyl ester of dibasic acid is di(2-ethyl hexyl) sebacate.

23. The composition as defined in claim 19 wherein said orthosilicate is hexa(2-ethyl butoxy)disiloxane and said dialkyl ester of dibasic acid is di(2-ethyl hexyl) sebacate.

24. The composition consisting essentially of about 70 to 95% orthosilicate ester having a total of from 16 to 60 carbon atoms and from 1 to 2 silicon atoms each of which has at least three of the four chemical bonds attached to alkoxy radicals of from 4 to 12 carbon atoms, and, when having one such silicon atom, the fourth bond is attached to such an alkoxy radical, and when having two silicon atoms, the fourth bond of each is attached to the same linking oxygen atom, said orthosilicate ester having the disadvantageous property of causing shrinking of Buna-N packing material, and from about 30 to 5% of dialkyl ester of dibasic acid represented by the formula ROCO(CH$_2$)$_n$COOR′ where R and R′ may have from 4 to 9 carbon atoms and are tertiary alkyl carbinyl groups, the (CH$_2$)$_n$ group is straight chain, and $n$ may be any number from 4 to 8, and the ester may have from 14 to 28 carbon atoms per molecule dissolved therein and compatible therewith plasticizing said Buna-N packing material and thus counteracting said deplasticizing and shrinking of said Buna-N packing material.

25. The composition as defined in claim 24 in which said orthosilicate is tetra(alkyl)orthosilicate in which the alkyl radicals have from 4 to 12 carbon atoms and the orthosilicate a total from 16 to 40 carbon atoms.

26. The composition as defined in claim 24 in which said orthosilicate is hexa(alkoxy)disiloxane in which the alkoxy radicals have from 4 to 12 carbon atoms and the disiloxane a total from 24 to 48 carbon atoms.

27. The composition as defined in claim 24 in which said orthosilicate is tetra(2-ethylhexyl) orthosilicate.

28. The composition as defined in claim 24 in which said orthosilicate is hexa(2-ethylhexoxy) disiloxane.

29. The composition as defined in claim 24 in which said orthosilicate is hexa(2-ethylbutoxy) disiloxane.

30. The composition as defined in claim 24 in which said dialkyl ester is di(2,2,4-trimethylpentyl) sebacate.

31. The composition as defined in claim 24 in which said dialkyl ester is di(1-methylcyclohexylmethyl) sebacate.

32. The composition as defined in claim 24 in which said dialkyl ester is di(2,2,4-trimethylpentyl) adipate.

33. The composition consisting essentially of 70 to 95% orthosilicate ester having a total of from 16 to 60 carbon atoms and from 1 to 2 silicon atoms each of which has at least three of the four chemical bonds attached to alkoxy radicals of from 4 to 12 carbon atoms, and, when having one such silicon atom, the fourth bond is attached to such an alkoxy radical, and, when having two such silicon atoms, the fourth bond of each is attached to the same linking oxygen atom, useful as a hydraulic fluid and lubricant but deplasticizing and shrinking Buna-N packing material, and a sufficient proportion of from 30 to 5% phosphate ester dissolved therein and compatible therewith plasticizing said Buna-N packing material and thus counteracting said deplasticizing and shrinking of said Buna-N packing material.

34. The composition as defined in claim 33 wherein said phosphate ester is tri(2-ethyl hexyl)phosphate.

35. A high-temperature hydraulic fluid and lubricant composition for use in a hydraulic system having a packing material which will be contacted by said fluid, said fluid consisting essentially of from 70 to 95 percent orthosilicate ester having a total of from 16 to 60 carbon atoms and from 1 to 2 silicon atoms each of which has at least three of the four chemical bonds attached to alkoxy radicals of from 4 to 12 carbon atoms, and, when having only 1 such silicon atom, the fourth bond is attached to such an alkoxy radical, and, when having two such silicon atoms, the fourth bond of each is attached to the same linking oxygen atom, said orthosilicate ester useful as a hydraulic fluid and lubricant in said system but shrinking said packing material to cause leakage of said fluid from said system, and a sufficient proportion of from 30 to 5% pentaerythritol tetra (n-caproate) dissolved in said fluid and compatible therewith and thermally stable over the temperature range of −65° F. to 500° F. for plasticizing said packing material and thus counteracting said shrinking of said packing material.

References Cited in the file of this patent

UNITED STATES PATENTS

| | | |
|---|---|---|
| 2,698,836 | Morrell | Jan. 4, 1955 |
| 2,717,242 | Foehr | Sept. 6, 1955 |

FOREIGN PATENTS

| | | |
|---|---|---|
| 711,380 | Great Britain | June 30, 1954 |

OTHER REFERENCES

Zimmerman et al.: "Handbook of Material Trade Names," 1953, Industrial Research Service, Dover, N.H., p. 65.

"Condensed Chemical Dictionary," 4th Ed., 1950, Reinhold Pub. Corp., N.Y., p. 338.

"Ucon" Fluids and Lubricants, 1948, Carbide and Carbon Chem. Corp., N.Y., pp. 15 and 16.